No. 817,006. PATENTED APR. 3, 1906.
E. J. RYAN.
TRAP.
APPLICATION FILED JULY 1, 1905.
2 SHEETS—SHEET 1.
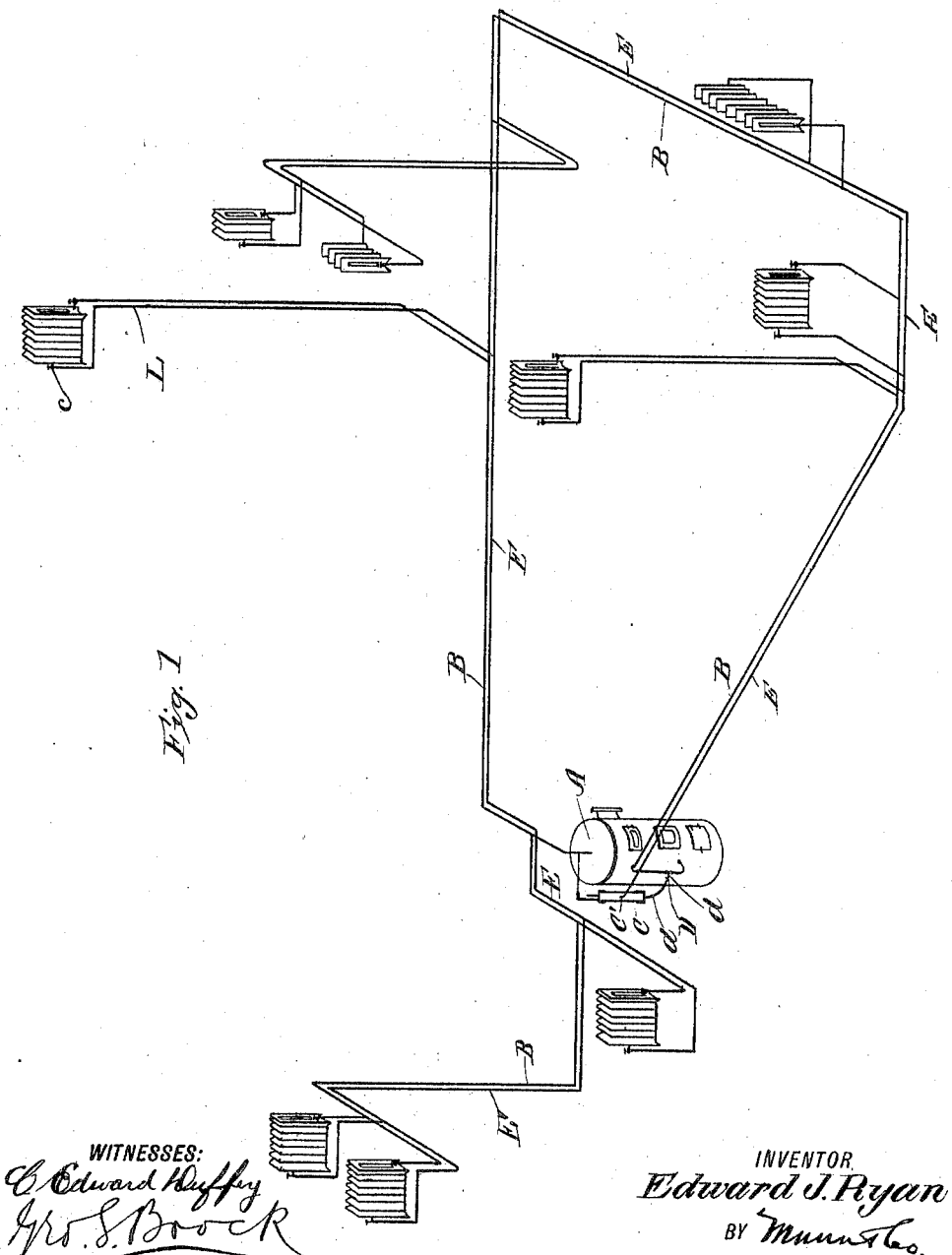
WITNESSES:
INVENTOR
Edward J. Ryan
BY
ATTORNEYS No. 817,006. PATENTED APR. 3, 1906.
E. J. RYAN.
TRAP.
APPLICATION FILED JULY 1, 1905.
2 SHEETS—SHEET 2.
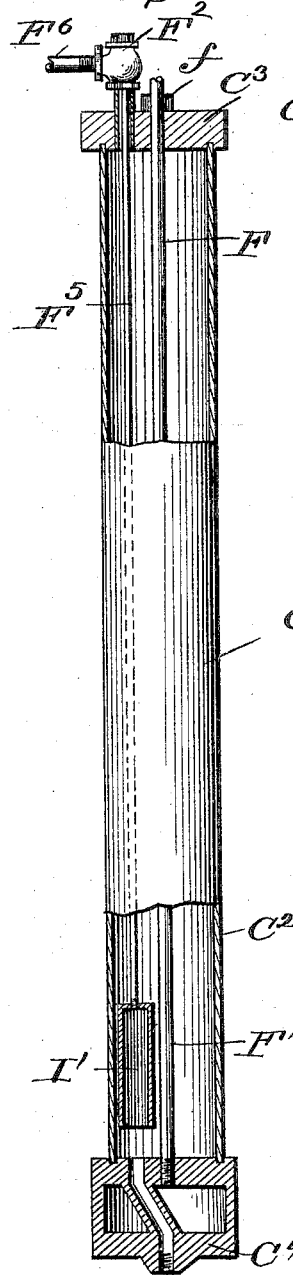
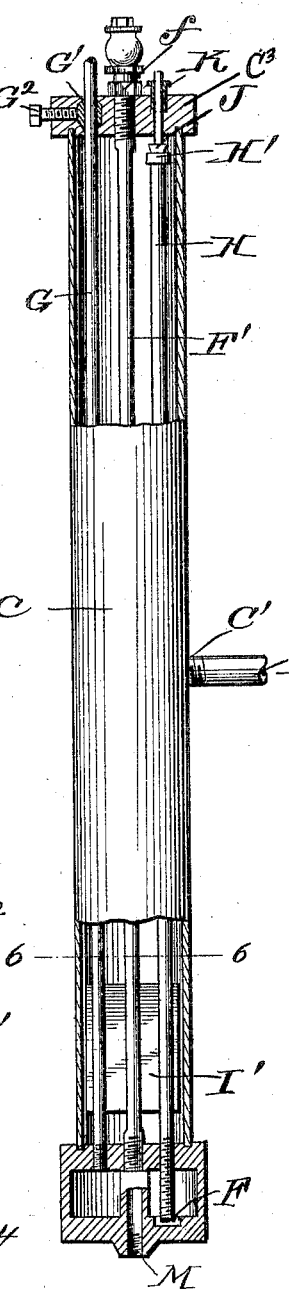
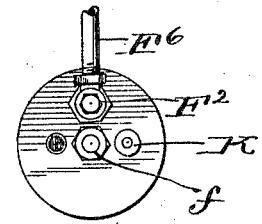
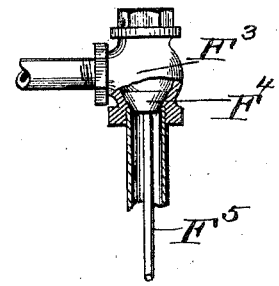
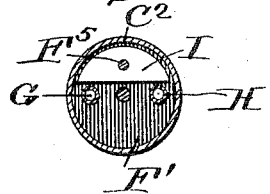
WITNESSES:
INVENTOR
Edward J. Ryan.
BY
ATTORNEYS

UNITED STATES PATENT OFFICE.

EDWARD JOHN RYAN, OF DANVILLE, ILLINIOS.

TRAP.

No. 817,006.  Specification of Letters Patent.  Patented April 3, 1906.

Application filed July 1, 1905. Serial No. 267,891.

*To all whom it may concern:*

Be it known that I, EDWARD JOHN RYAN, a citizen of the United States, residing at Danville, in the county of Vermilion and State of Illinois, have invented a new and useful Improvement in Traps, of which the following is a specification.

My invention relates to an improvement in apparatus for steam-heating, its object being to provide simple and effective means whereby the air forced from the radiators by the steam-pressure is allowed to discharge into the atmosphere and the discharge-pipe therefor then sealed to prevent inlet of air, and thereby causing a vacuum to be formed in the entire heating apparatus whenever the temperature of the water in the boiler or generator arrives at 212° Fahrenheit, (the temperature at which water boils under atmospheric pressure.) Creating a vacuum at this time in the apparatus, it has the effect of allowing the water to continue to boil, and thereby generates steam under a vacuum, and thereby making any steam-heating system a combined pressure and vacuum steam-heating system, and also to provide a means whereby the water of condensation is trapped and carried back to the boiler or steam-generator.

To these ends my invention consists of certain novel features, as will be hereinafter fully described, and pointed out in the claims, reference being had to the accompanying drawings, in which—

Figure 1 is a diagrammatic view of a steam-heating system, showing location of my improved trap. Fig. 2 is an elevation, partly in section, of the trap. Fig. 3 is a similar view taken from another point. Fig. 4 is a top plan view of the trap. Fig. 5 is a detail section of connection between top of trap and the steam-supply pipe. Fig. 6 is a transverse section on line 6 6 of Fig. 3.

A represents the boiler, and B the steam-supply pipe leading therefrom to the various radiators in the system and returning to the boiler, the system illustrated being a one-pipe system.

C is the trap, located near the boiler above the water-line and connected to it below the water-line by the pipe D, which is provided with a check-valve at $d$ between the trap and the boiler.

E is the line of air-pipe connected to the trap at C' and is continued by pipe L from the trap to every radiator, coil, &c., in the system that derives steam from the boiler. This line of air-pipe is intended to be suspended from the steam-supply main and branches and continued up and connected to the radiator at $c$, the same place where the ordinary air-valve is usually placed.

The trap is constructed of an iron casting $C^2$, having the two heads $C^3$ and $C^4$, the head $C^4$ having contained within it a mercury-well F and having the pipes G and H extending upwardly therefrom. The pipe G is of iron and extends through the head $C^3$ and leads to the atmosphere. The pipe H, which is of expansible metal, extends down into the mercury-well and upwardly to near the head $C^3$ and is provided with a valve-seat H' for the valve J, threaded through the head $C^3$ and packed by means of nut K.

F' is a rod screwed into the lower head $C^4$ and passes through the upper head $C^3$. The upper end of said rod F' is threaded, and on this threaded end is screwed the nut $f$, by means of which the two heads are clamped to the casing $C^2$ and held securely in place.

$F^2$ is an elbow screwed into an opening in the upper head $C^3$, said elbow having a valve-chamber $F^3$, in which is seated a valve $F^4$, which is secured to a rod $F^5$, connected at its lower end to the float I', which is an inverted cup. The elbow has a branch pipe $F^6$, which connects with the steam-supply main B or the generator A.

The iron pipe G passes through a metallic packing-ring G', held in the head by the set-screw $G^2$.

L is the connection from the point of the radiator, where the usual air-valve is located, to the pipe E, leading to the trap.

M is the condensation outlet-passage from the bottom of the trap to the water-space of the steam-boiler and is provided with a check-valve to prevent the water in the boiler entering the trap.

The mercury-well F is in all respects a vacuum-gage and also a check against admission of air into the heating apparatus. The pipe H is an expansion-valve, made of brass or other expansive metal which expands under a given temperature more than C and G, which are made, say, of iron, which is less expansive than H. This greater expansion of H serves to prevent steam finding an outlet through H to the atmosphere. This is done by pipe H expanding longitudinally and closing its upper end against the valve J.

The mercury-well is so constructed that it will retain ample mercury to entirely fill the tube H whenever a vacuum is created in the heating apparatus or radiator. The lower end of the tube H is sealed in mercury by being immersed therein about one-half inch. This prevents air which may enter through pipe G from finding ingress into the heating apparatus by flowing upward through tube H and at the same time does not prevent air, &c., flowing downward through tube H under slight pressure in the heating apparatus finding an outlet to the atmosphere through pipe $G''$. The float $I'$ is attached to the lower end of the valve-rod $F^5$, which operates the valve $F^4$. Whenever from any cause the water that is condensed in the air-line and which arrives at the trap through inlet $C'$ does not have sufficient head to overcome the difference in pressure between the generator and the trap to cause it to flow back to the boiler by gravity, it will collect in the trap and raise the float $I'$, thus allowing steam from the boiler to enter the trap through the valve $F^4$ and equalize the pressure, thus permitting the water aforesaid to flow back into the boiler. When, however, first, the trap is so placed that the hydrostatic head is sufficient to overcome this difference in pressure or when, second, the area of the air-line E is sufficient to prevent a difference in pressure, the float $I'$ is not called into action. The valve $F^4$ is adjustable in the head $C^3$ and need not be changed after once being adjusted.

On many modern "one-pipe" systems of low-pressure steam-heating systems in common use the radiator is provided with a valve on the steam-pipe, and the only thing necessary to provide for installation of my improved trap and system is a small angle-valve or a valve in place of the regular air-valve and a line of small pipes from said valve to the inlet $C'$ of the casing of the trap. This small valve need only be used whenever the steam-valve is closed or opened in order to heat the radiator or shut it off. It then becomes necessary to close or open the small valve, as the case may be, to prevent the radiator being "short-circuited" through the air-pipe.

On many modern two-pipe systems of low-pressure steam-heating systems in common use each radiator is provided with steam and return valves and an air-valve. The only thing necessary to provide for this installation of my improved trap and system is a small valve in place of the regular air-valve and a line of pipes as described for one-pipe system. In either system as installed originally or in any steam-heating system being installed at this or any future time the installation of my trap and the necessary small air or vapor pipes as described will provide a system of steam-heating that will cause steam to circulate either under pressure or vacuum and will change from vacuum to pressure or pressure to vacuum at any and all times whenever the temperature of the water in the boiler is ascending or descending from and at 212° Fahrenheit or atmospheric pressure. The fact is that the principal intention of my improved trap and my system is to prevent a loss of steam and water through the air-valves and to provide a means whereby a vacuum can be secured in any steam-heating apparatus where the water of condensation is returned to the boiler by gravity. To accomplish this end by the condensation of the steam in the said heating apparatus, a vacuum will be formed in any and every steam-heating apparatus whenever the steam contained therein is condensed, and this trap provides a means whereby the air contained in the space that is to be occupied by steam for heating purposes may escape to the outside atmosphere and at the same time prevent the return of the expelled air, thereby providing a void space or an apparatus containing a vacuum, and by thus securing a vacuum water will be caused to boil or generate steam below 212° Fahrenheit.

As stated, the pipe $F^6$ is connected to the steam-supply B, so that when an accumulation of water of condensation in the trap causes the float $I'$ to rise and open valve $F^4$ the pressure in trap is equalized, and said water of condensation will return to the boiler by gravity through the bottom outlet M.

Having thus described my invention, what I claim as new, and desire to secure by Letters Patent, is—

1. A trap for steam-heating systems consisting of a casing, a mercury-well located in the lower portion of said casing, connections between the lower end of the casing and the steam-generator below its water-line, a pipe communicating with the mercury-well and extending through the upper end of the casing, an expansible pipe extending down into the mercury-well to near its bottom, said expansible pipe extending upwardly within the casing to near its upper head and having a valve-seat at its upper end, a valve adjustably secured in said upper head adjacent to the upper end of the expansible pipe, the valve-seat at the upper end of the expansible pipe adapted to engage the aforesaid valve and be closed thereby upon expansion of said pipe, and a connection between the interior of the casing and the air-space of the radiators, coils, &c., of the heating system.

2. A trap for steam-heating systems consisting of a casing provided with upper and lower caps, connection between the lower end of the casing and the steam-generator below its water-line, a pipe communicating with the mercury-well and extending through the upper end of the casing, an expansible pipe extending from near the lower wall of the mercury-well to near the upper end of the casing, a valve located adjacent to the upper end of said pipe, a float within the casing, a stem extending upwardly from the float, a valve carried at the upper end of said stem, a pipe connection between the interior of the casing and the steam-supply, a valve-seat within said connection adapted to receive the valve carried by the stem, and connections between the interior of the trap and air-space of the radiators, &c.

3. A steam-heating system comprising a generator, radiators and connections between the generator and the radiators, a trap into which the air of the radiators may exhaust, which trap communicates from its lower end with the generator below its water-line, said trap consisting of a casing, upper and lower heads, a mercury-well therein, an expansible pipe, a valve adjustably secured in the upper head of the casing adjacent to the valve-seat at the upper end of the expansible pipe, and adapted to seal said pipe upon expansion thereof, and a connection between the interior of the casing and the air-space of the radiators, &c.

EDWARD JOHN RYAN.

Witnesses:
W. R. JEWELL, Jr.,
L. A. SMITH.